(12) United States Patent
Bakker et al.

(10) Patent No.: US 12,187,238 B2
(45) Date of Patent: Jan. 7, 2025

(54) CLEANING UNIT, SCRAPER UNIT, OPTICAL SENSING DEVICE AND METHOD FOR CLEANING

(71) Applicant: MCi (Mirror Controls International) Netherlands B.V., Woerden (NL)

(72) Inventors: Ilona Bakker, Woerden (NL); Dave Lambert Adrian Van Soest, Woerden (NL); Jannick Daniel Wijntjes, Rotterdam (NL); Meindert Jan Solkesz, Rotterdam (NL)

(73) Assignee: MCI (MIRROR CONTROLS INTERNATIONAL) NETHERLANDS B.V., Woerden (NL)

( * ) Notice: Subject to any disclaimer, the term of this patent is extended or adjusted under 35 U.S.C. 154(b) by 59 days.

(21) Appl. No.: 17/762,919

(22) PCT Filed: Oct. 23, 2020

(86) PCT No.: PCT/NL2020/050658
§ 371 (c)(1),
(2) Date: Mar. 23, 2022

(87) PCT Pub. No.: WO2021/080430
PCT Pub. Date: Apr. 29, 2021

(65) Prior Publication Data
US 2022/0332288 A1     Oct. 20, 2022

(30) Foreign Application Priority Data
Oct. 24, 2019   (NL) ...................................... 2024098

(51) Int. Cl.
B60S 1/04         (2006.01)

(52) U.S. Cl.
CPC .......... *B60S 1/0477* (2013.01); *B60S 1/0486* (2013.01)

(58) Field of Classification Search
None
See application file for complete search history.

(56) References Cited

U.S. PATENT DOCUMENTS

| | | | |
|---|---|---|---|
| RE32,218 E * | 7/1986 | Kunert | B60J 1/02 |
| | | | 15/250.19 |
| 10,259,431 B1 * | 4/2019 | Ybarra | B60S 1/566 |
| 2017/0369039 A1 | 12/2017 | Rousseau | |

FOREIGN PATENT DOCUMENTS

| | | |
|---|---|---|
| DE | 1911991 A1 | 9/1970 |
| DE | 3138388 A1 | 8/1982 |
| EP | 0832798 B1 | 9/2001 |

(Continued)

*Primary Examiner* — Natasha N Campbell
*Assistant Examiner* — Pradhuman Parihar
(74) *Attorney, Agent, or Firm* — Volpe Koenig

(57) ABSTRACT

The invention relates to a cleaning unit for cleaning a sensor window pane of an optical sensing device of a motor vehicle. The optical sensing device can preferably be for optical distance measurement, more preferably it can be a LiDAR sensor device. The cleaning unit comprises a wiper blade. The cleaning unit further comprises at least a first scraper for scraping impediments off the wiper blade. The cleaning unit is arranged for wiping the wiper blade over the sensor window pane. The cleaning unit is further arranged for moving at least one of the wiper blade and the first scraper with respect to each other and along each other for scraping impediments off the wiper blade.

23 Claims, 7 Drawing Sheets

(56) References Cited

FOREIGN PATENT DOCUMENTS

Figure 1:
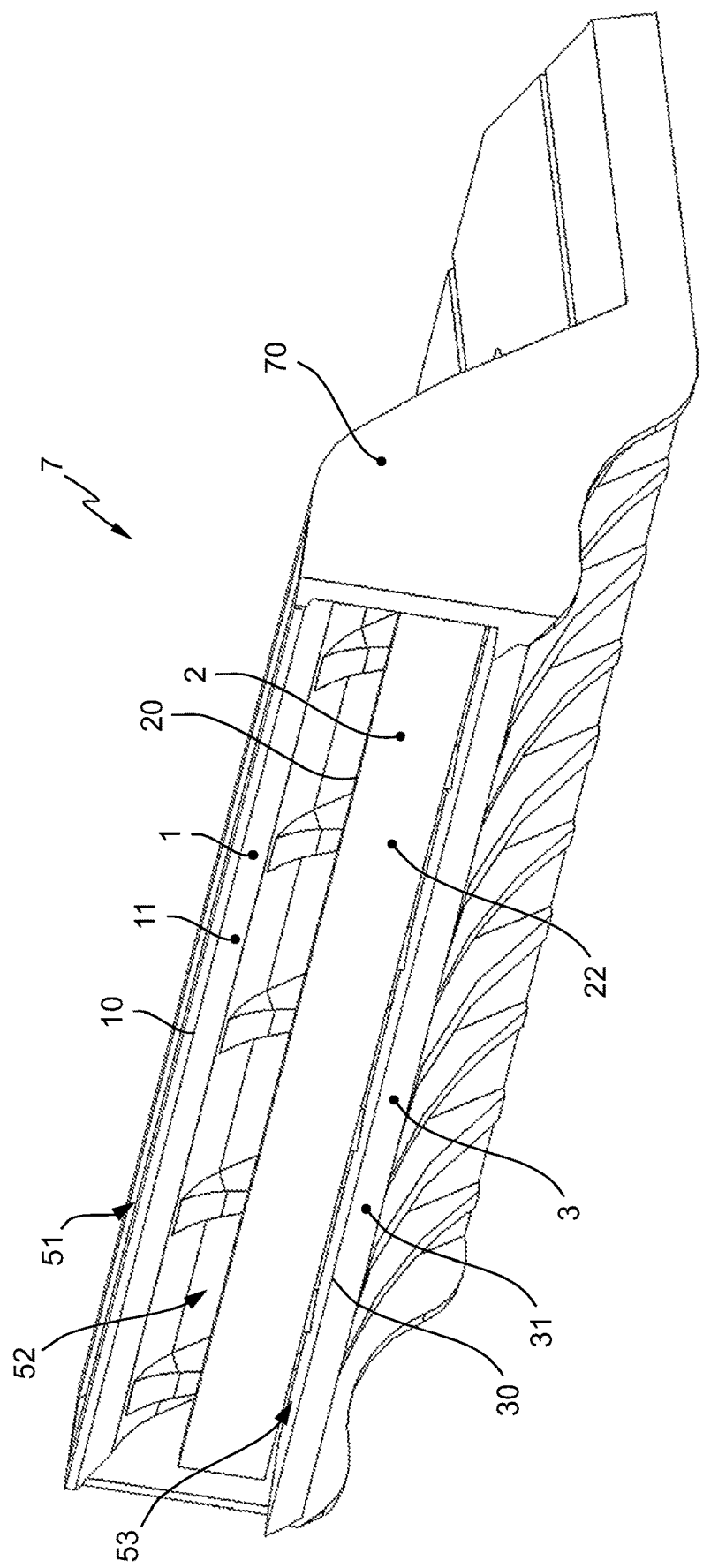

| | | |
|---|---|---|
| JP | S5787745 A | 6/1982 |
| JP | S5949514 U | 4/1984 |
| JP | H06179348 A | 6/1994 |
| JP | H09507448 A | 7/1997 |
| JP | 2005205929 A | 8/2005 |
| JP | 2018502772 A | 2/2018 |

* cited by examiner

CLEANING UNIT, SCRAPER UNIT, OPTICAL SENSING DEVICE AND METHOD FOR CLEANING

CROSS REFERENCE TO RELATED APPLICATIONS

This application is a 35 USC § 371 National Stage application of International Patent Application No. PCT/NL2020/050658, which was filed on Oct. 23, 2020, entitled "CLEANING UNIT, SCRAPER UNIT, OPTICAL SENSING DEVICE AND METHOD FOR CLEANING" which claims priority to Netherlands Patent Application No. 2024098, filed Oct. 24, 2019 and is incorporated herein by reference as if fully set forth.

The invention relates to a method for cleaning a sensor window pane of an optical sensing device of a motor vehicle. Preferably, the method can be for cleaning the sensor window pane of an optical sensing device for optical distance measurement, more preferably a LiDAR sensor device.

Motor vehicles, both for manual operation as well as for substantially autonomous driving, are usually equipped with various optical sensing devices, which for instance may be for optical distance measurement. For example, by estimating distances between the vehicle and objects in the vehicle's environment, a map of an environment of the vehicle may be generated. A particular kind of optical sensor technology employed is known as Lidar or LIDAR or LiDAR ("Light Detection And Ranging" or "Laser Imaging Detection And Ranging"), also called LADAR ("LAser Detection And Ranging") or 3D laser scanning.

Usually, an optical sensing device, such as an optical distance measuring device, particularly a LiDAR sensing device, may include one or more light sources, preferably one or more laser light sources, for transmitting one or more light beams, preferably one or more laser light sources, into the environment. The optical sensing device may further comprise one or more optical detectors for detecting reflections of the transmitted one or more light beams, and may further comprise a processing unit, for instance for generating a mapping of the environment based on transmission data and data relating to detected reflections of the light. Further, the optical sensor device usually comprises a sensor window pane which forms an outer face of the optical sensor device. The sensor window pane may then form an optically transparent protection layer for protecting underlying sensor components such as the one or more light sources and/or optical detectors. Light can thus be transmitted and detected through the sensor window pane, and in order to obtain a substantially unobstructed view of the environment, the optical sensing device is typically arranged at an outside of the vehicle, wherein the sensor window pane faces the environment and faces away from the vehicle, preferably in substantially forward direction.

Being at an outside of the vehicle, the sensing device, specifically the sensor window pane, is susceptible to collecting impediments, such as rain droplets, particulates, bugs, etc., that could obstruct, deflect other otherwise interfere with the optical signals traveling across the sensor window pane, and which may result in erroneous sensor data.

An object of the present disclosure may lie in providing a means and/or a method for at least alleviating at least one of the drawbacks of a known sensing device of a motor vehicle, in particular at least alleviating at least one of the above mentioned drawbacks. In particular, it may be preferred to ameliorate sensor data of an optical sensor device of a motor vehicle. More particular, it may be preferred to minimize the accumulation of optical impediments, such as rain droplets, particulates, bugs, etc., on a sensor window pane of an optical sensing device.

According to a first aspect of the present disclosure there is provided a method for cleaning a sensor window pane of an optical sensing device, preferably for optical distance measurement, more preferably a LiDAR sensor device, of a motor vehicle, comprising the steps of wiping at least a portion of the sensor window pane by means of a wiper blade; and scraping along a side face of the wiper blade, preferably in a direction towards a tip of the wiper blade.

By wiping the wiper blade over the sensor window pane, water drops and/or other impediments which may obstruct the view of the optical sensing device can be removed from the sensor window pane, which for instance may result in improved sensor data and/or improved accuracy. By scraping along a side face of the wiper, preferably in a direction towards a tip of the wiper blade, impediments removed from the sensor window pane and carried away by the wiper blade may be removed from the wiper blade, which for instance can counteract that the wiper blade may unintentionally deposit such impediments when it sweeps over the sensor window pane again. The scraper may thus improve the efficiency of the use of the wiper blade.

In an embodiment, the method can further comprise a step of sweeping the tip of the wiper blade over a wipe off surface in order to wipe liquid and/or other impediments off the wiper blade and onto the wipe off surface, before again wiping the wiper blade over at least a portion of the sensor window pane. As a result, liquid and/or other impediments, which may be present at or near the wiper blade tip, in particular on or at a bottom plane of the wiper blade, if any, may be swept off from the wiper blade onto the wipe off surface. Preferably, during the step of sweeping the tip of the wiper blade over a wipe off surface, the wiper blade may be in a first position, in particular a first angular position, with respect to the wipe off surface, which first position may substantially correspond with a second position, in particular a second angular position, with respect to the sensor window pane in which the wiper blade is while said wiper blade is wiped over the sensor window pane. As a result, it can be promoted that liquid and/or other impediments present at or near the wiper blade tip may be deposited, in particular spread out, onto the wipe off surface. Preferably, the deposit liquid may be allowed to flow down the wipe off surface and/or may be removed at least partly by means of capillary action, for example by means of a drainage slit arranged for letting water through said slit by means of capillarity.

In a further embodiment, the method may also comprise a further step of scraping an additional time along said side face of the wiper, in particular in a direction towards a tip of the wiper blade, preferably means of a further scraper. Said further step of scraping an additional time along the side face of the wiper blade may be executed before again wiping the wiper blade over at least a portion of the sensor window pane, and preferably after the above mentioned optional step of sweeping the tip of the wiper blade over a wipe off surface. In the further step of scraping an additional time along said side face of the wiper, the last remaining impediments, e.g. liquid and/or dirt, may be scraped off at least partly from the wiper blade, in order to facilitate that the wiper blade can become relatively clean before it is wiped over the sensor window pane again.

In a second aspect of the disclosure, there is provided a cleaning unit for cleaning a sensor window pane of an optical sensing device, preferably for optical distance measurement, more preferably a LiDAR sensor device, of a motor vehicle. Preferably, said cleaning unit may be arranged for carrying out the above mentioned method at least partly. The cleaning unit comprises a wiper blade and at least a first scraper for scraping impediments off said wiper blade. The cleaning unit is arranged for wiping the wiper blade over the sensor window pane, and said cleaning unit is further arranged for moving at least one of the group consisting of the wiper blade and the first scraper with respect to each other and along each other for scraping impediments off the wiper blade by means of said first scraper.

By arranging the cleaning unit such that it can scrape off optical impediments, such as dirt and/or liquids, from the wiper blade, it can be facilitated that the wiper blade is relatively clean when it wipes again over the sensor window pane, thereby promoting a relatively efficient and/or effective cleaning of the sensor window pane and/or improving sensor use and/or accuracy and/or sensor data.

Advantageously, the first scraper can be fixed with respect to the position of the sensor window pane, and the cleaning unit can be arranged for moving the wiper blade with respect to the first scraper such as to scrape the wiper blade along the scraper. As a result, the cleaning unit may for instance comprise one or more drive units which are both for wiping the wiper blade over the sensor window pane and for moving the wiper blade along the first scraper. The cleaning unit may be of a relatively simple design, for instance as a result of facilitating that a drive unit for driving the scraper may be omitted in case of a fixed scraper.

In embodiments, the cleaning unit may comprise a wipe off surface, preferably a wipe off surface being located downstream from the first scraper, and the cleaning unit may be arranged for allowing the wiper blade tip to sweep over said wipe off surface. Said wipe off surface may facilitate that liquid and/or dirt can be wiped off from the wiper blade onto said wipe off surface by sweeping the wiper blade over said wipe off surface. Advantageously, the wipe off surface is located substantially parallel to the outer surface of the sensor window pane, more preferably substantially in line with said outer surface of the sensor window pane. This may facilitate for instance that when the wiper blade is substantially held in a certain state or position, in particular a certain rotational state or rotational position, and is moved substantially linearly, first along the sensor window pane, then over the first scraper and subsequently along the wipe off surface, the wiper blade may be in substantially the same position with respect to the sensor window pane as with respect to the wipe off surface, thereby for instance promoting that liquid and/or dirt that in such position could be deposited onto the sensor window pane may already be deposited to the wipe off surface before the wiper blade is swept over the sensor window pane again.

In embodiments, the wipe off surface can be formed by a second scraper, and said second scraper can comprise a second scraper edge, preferably located at a proximal end of the wipe off surface, such that the wiper blade can be scraped at least partly two times before it is swept over the wipe off surface.

Alternatively or additionally, in embodiments, the cleaning unit may comprise a further scraper, in particular a third scraper, which may facilitate that any contamination still remaining on the wiper blade, after said wiper is been swept over the wipe off surface, may be removed from said wiper blade at least partly.

At least in preferred embodiments, the wiper blade may be made of a material that is relatively flexible and/or relatively resilient with respect to the material of the window pane. Additionally or alternatively, the wiper blade may be made of a material that is relatively flexible and/or relatively resilient with respect to the material of the first scraper and/or with respect to the material of the wipe off surface and/or with respect to the material of the second scraper and/or with respect to the material of the further scraper. For example, the wiper blade may be made from a rubber or rubbery material. The sensor window pane may for example comprise an optically transmissive material, which is substantially smooth and/or homogeneous to avoid localized refractive index variations. The sensor window pane can for example be substantially flat, or alternatively curved in a desired shape, for example with a desired radius of curvature to optimize a viewing angle of the optical sensing device. A shape of the wiper blade, in particular of the tip of the wiper blade, can be arranged to correspond to the shape of the sensor window pane for optimal cleaning of the sensor window pane.

In a further aspect of the disclosure, there is provided a scraper unit for the cleaning unit, wherein the scraper unit comprises at least a first scraper defining a first scraper edge for scraping impediments off the wiper blade of the cleaning unit, preferably wherein the scraper unit further comprises a wipe off surface, more preferably wherein the wipe off surface is spaced apart from the first scraper edge, yet more preferably spaced apart from the first scraper.

In a further aspect of the disclosure, an optical sensing device, in particular a LiDAR sensor device, is provided.

Advantageous embodiments according to the present disclosure are described in the appended claims.

By way of non-limiting examples only, embodiments of the present disclosure will now be described with reference to the accompanying figures in which:

FIG. 1 shows a schematic perspective view of an embodiment of a scraper unit for a cleaning unit for cleaning a sensor window pane of an optical sensing device according to an aspect of the present disclosure; and FIGS. 2A-2F show schematic, partly cut-away, cross-sectional views of an embodiment of a cleaning unit for cleaning a sensor window pane of an optical sensing device according to an aspect of the present disclosure in different states thereof.

It is noted that the figures show merely preferred embodiments according to the present disclosure. In the figures, the same or similar reference signs or numbers refer to equal or corresponding parts.

FIG. 1 shows a schematic perspective view of an embodiment of a scraper unit 7 for use in a cleaning unit 8, wherein the cleaning unit 8 is arranged for cleaning a sensor window pane 91 of an optical sensing device 90. FIGS. 2A-2F show schematic, partly cut-away, cross-sectional views of the cleaning unit in six different states of said cleaning unit 8. The cleaning unit 8 is for cleaning a sensor window pane 91 of an optical sensing device 90 of a car or another motor vehicle, in particular for cleaning the outer surface 92 of the sensor window pane 91. The optical sensing device 90 can preferably be for optical distance measurement, more preferably it can be a LiDAR sensor device.

The cleaning unit 8 comprises a wiper blade 40, preferably of a resilient and/or rubber or rubberlike material. The cleaning unit 8 is arranged for wiping the wiper blade 40, preferably at least its tip 41, over the sensor window pane 91, and the cleaning unit 8 and/or the wiper blade 40 may be arranged for pushing water, other fluid, such as cleaning fluid or precipitation 6, and/or other impediments 6 to light transmittance, away from at least a portion of the sensor window pane 91, for instance in a wiping direction D1 parallel to the outer surface 92 of the sensor window pane 91.

The cleaning unit 8 further comprises a first scraper 1 for scraping impediments 6 off the wiper blade 40. Further, the cleaning unit 8 is arranged for moving at least one of the wiper blade 40 and the first scraper 1 with respect to each other and along each other for scraping impediments 6 off the wiper blade 40. The first scraper 1 can be part of a scraping system or cleaning system for cleaning the wiper blade 40 at least partly. In particular, the first scraper 1 can be part of a scraper unit 7, which may be formed as an assembly comprising multiple parts 1, 2, 3 interconnected to each other, for instance by mounting them in a frame 70. However, the skilled person will understand that the scraper unit 7 may alternatively be formed integrally, for instance by means of integrally injection molding said scraper unit 7.

As is the case in the here shown embodiment, at least the first scraper 1, and preferably the entire scraping system 7, can be fixed with respect to the position of the sensor window pane 91 and wherein the cleaning unit 8 can in such embodiments then be arranged for moving the wiper blade 40 with respect to the first scraper 1 such as to scrape the wiper blade 40 along the scraper, and preferably also for moving the wiper blade 40 with respect to one or multiple optional further cleaning elements 2, 3 of the scraping system 7, such as for instance a wipe off surface 22 and/or a further scraper 3, which will be discussed in more detail here below.

Additionally or alternatively, in advantage embodiments, the cleaning unit 8 can be arranged for wiping the wiper blade 40 over the sensor window pane 91 from a first position, in particular a top position, towards a second position, in particular a lower position, such as to wipe at least a first portion of the sensor window pane 91 located between said first position and said second position, and wherein the cleaning unit 8 is arranged for moving the wiper blade 40 back from said second position substantially towards said first position without wiping over said first portion of the sensor window pane 91. As is the case in the here shown exemplary embodiment, the outer surface 92 of the sensor window pane 91 can extend upwards, preferably substantially vertically, and the wiper blade 40 may wipe at least a part of said outer surface 92, preferably by wiping in a downward direction D1. The wiper blade 40 wiping over the sensor window pane 91 may the push impediments 6 downwards, which may be beneficial, for instance as it does not have to work against gravitation.

For example, before moving the wiper blade 40 back to the first position, the wiper blade 40 may be moved away in a direction D4 substantially transverse to, and away from, the outer surface 92 of the sensor window pane 91. Alternatively, or additionally, the wiper blade 40 may be moved away from the virtual plane P92 in which the outer surface 92 of the sensor window pane 91 extends by rotating the wiper blade 40 in a rotational direction R4, for instance about a rotation axis A4 of a wiper 4 including said wiper blade 40.

It was found that unidirectional wiping, in particular wiping from the first position to the second position and while refraining from wiping from the second substantially towards the first position, may give relatively good cleaning results, especially compared to bidirectional wiping. Refraining from wiping on the return movement of the wiper blade 40 from the second position substantially towards the first position may counteract a fluid film from being deployed onto the sensor window pane 91 during the return movement. The wiper blade 40 may thus be in contact with the sensor window pane 91 while wiping from the first position to the second position, whereas the wiper blade 40 may be disengaged from the sensor window pane 91 during movement of the wiper blade 40 from the second position substantially towards the first position.

Figure 2A:
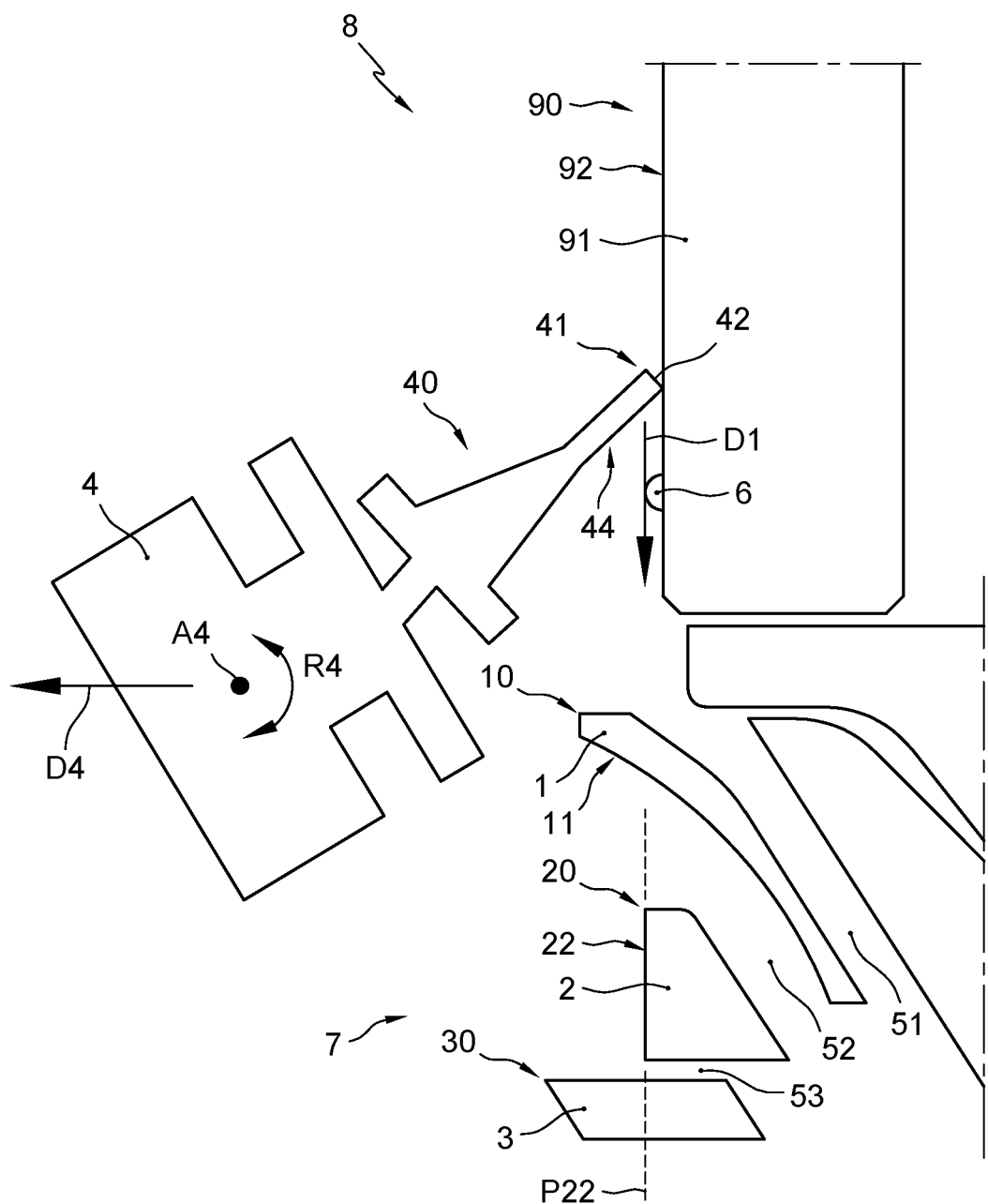
Figure 2B:
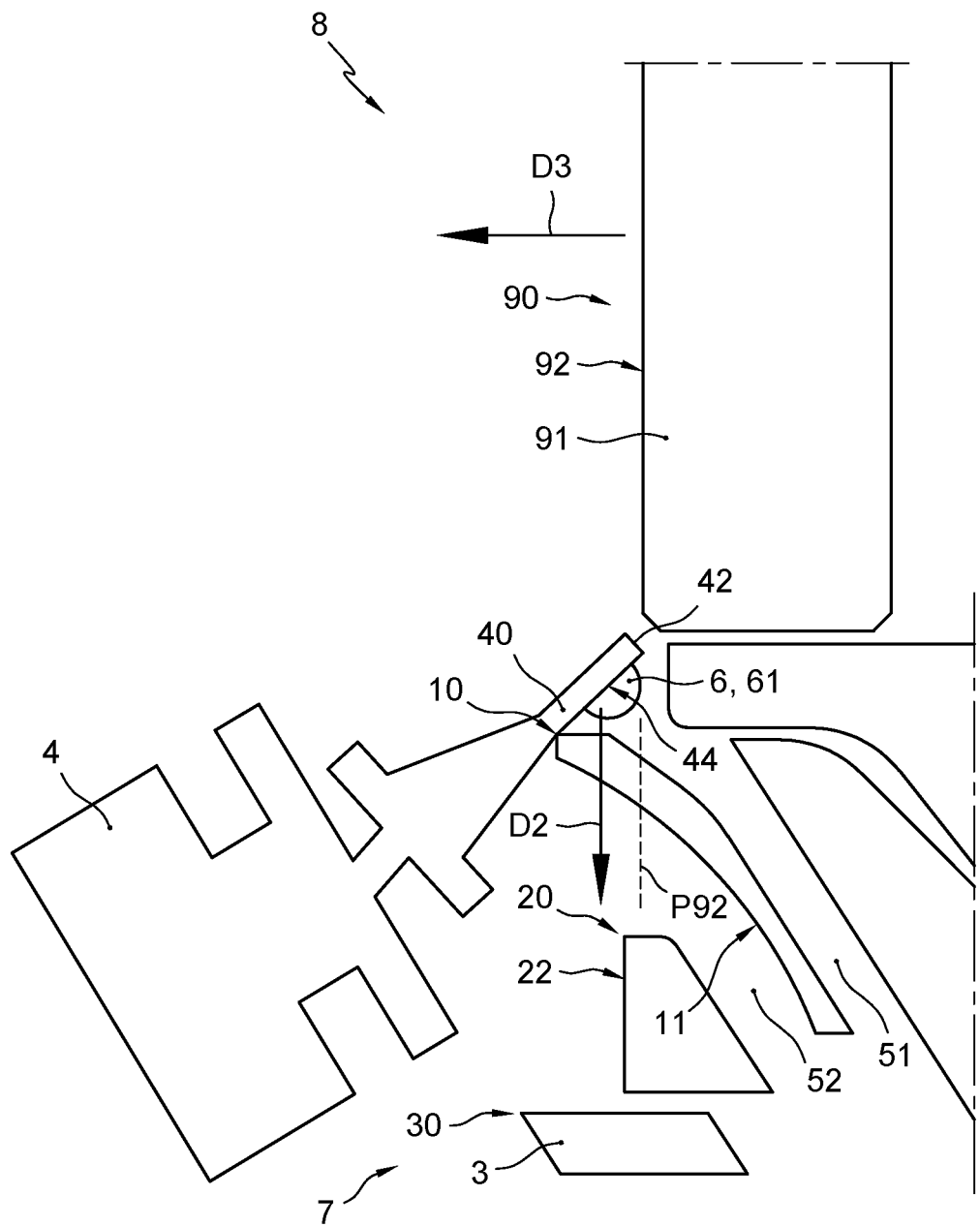

In embodiments the wiper 4 and/or the wiper blade 40 may be held substantially in a certain state or position, in particular a certain rotational state or rotational position, and can be moved substantially linearly, in particular in a wiping direction D1, first along the sensor window pane 91, for instance as shown in FIG. 2A, and subsequently over the first scraper 1, for instance as shown in FIG. 2B. Preferably, the first scraper 1 may protrude beyond a virtual plane P92 in which the outer face 92 of the sensor window pane 91 extends, as can be seen for instance in FIG. 2B. It will be appreciated that protruding can be considered as to mean projecting at the side of said virtual plane P92 opposite to the side at which the sensor window pane 91 is located. This is, in FIG. 2B, the sensor window pane 91 is located at the right side of said virtual plane P92, and the first scraper 1 protrudes to the left side of the virtual plane P92, which may correspond with the front side of the car or other motor vehicle provided with the cleaning unit 8.

The first scraper 1 can define a first scraping edge 10, and the cleaning unit 8 can be arranged such as to allow said first scraper edge 10 to engage a side face 44 of the wiper blade 40 at a location spaced apart from a tip 41 of said wiper blade 40, as can be seen in FIG. 2B. Subsequently, when the wiper blade 40 is moved further, in particular in a direction D2 substantially in line with a direction D1 in which it was moved during wiping the sensor window pane 91, the first scraper 1, in particular its first scraper edge 10, can scrape along said side face 44 of the wiper blade towards said tip 41 of the wiper blade 40, especially such as to scrape off impediments 6, 61, such as for instance bug parts, which then may be removed, in particular lead down, for instance by means of a first outlet channel 51 or the like.

Preferably, the first scraper 1 may have a relatively sharp edge 10, preferably such that its angle is smaller than 120°, preferably about 90°, such as is the case in the here shown embodiment, or smaller than 90°.

Figure 2C:
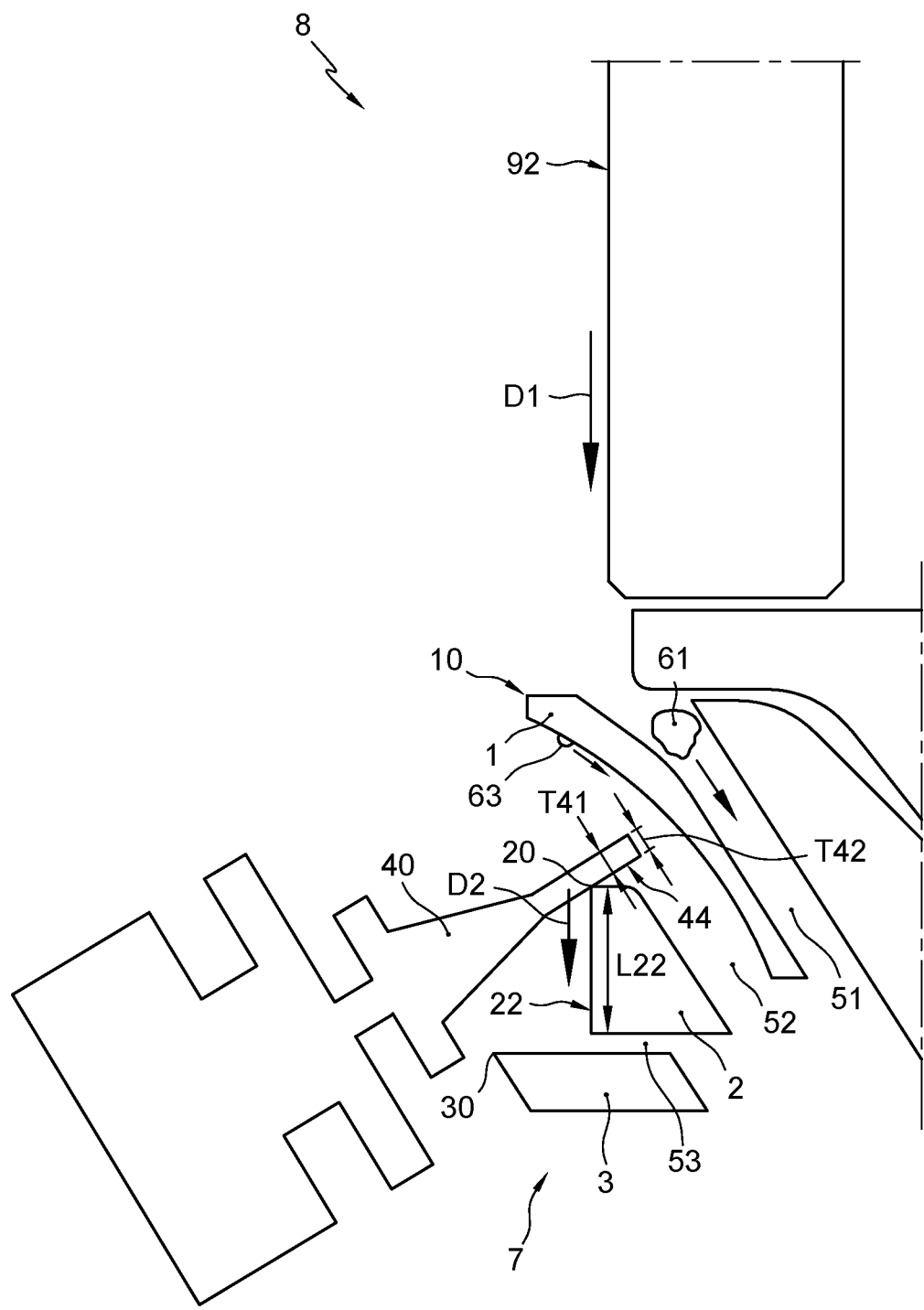
Figure 2D:
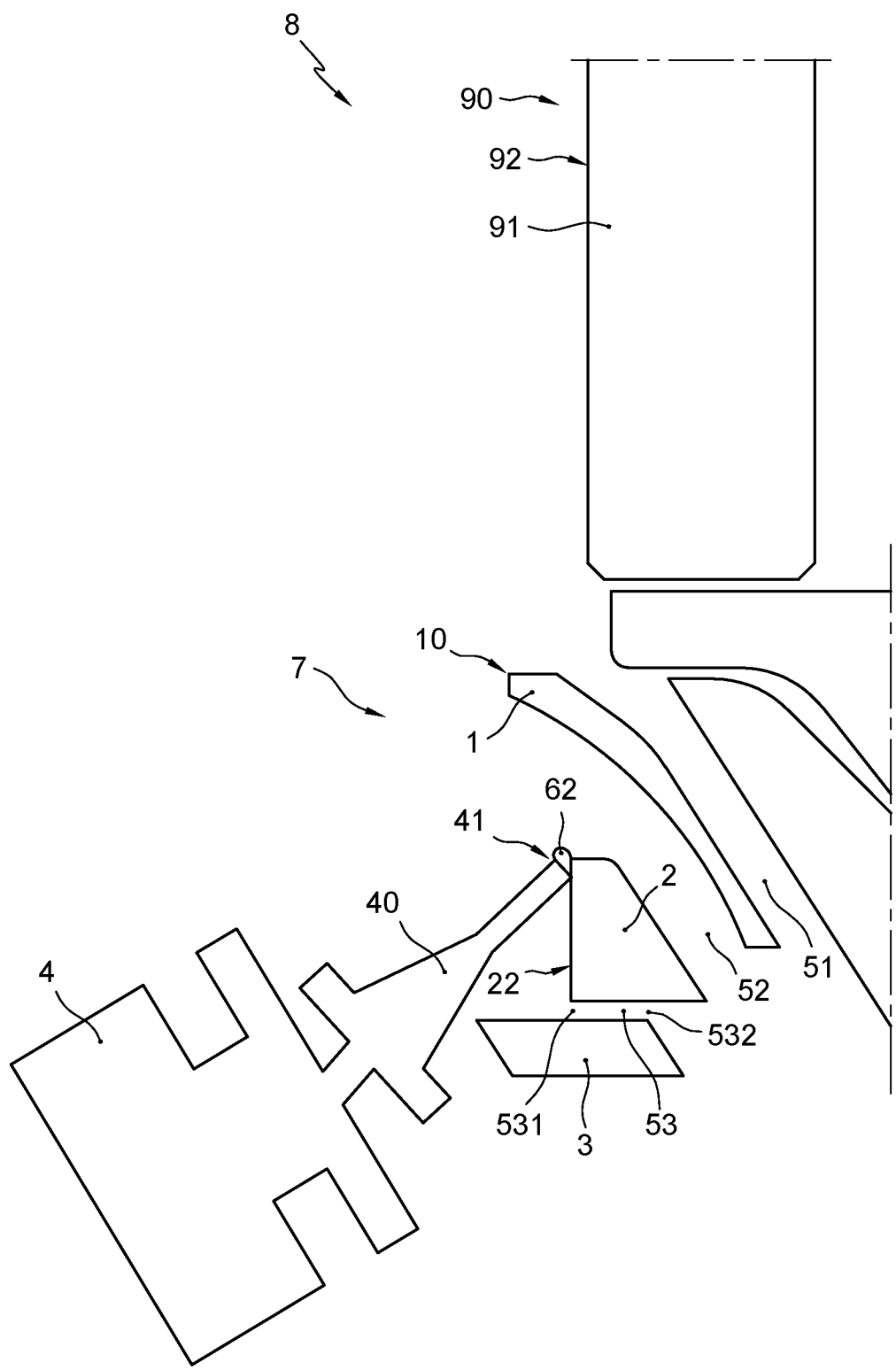

Advantageously, the cleaning unit 8 may further comprise a wipe off surface 22, and the cleaning unit 8 may then be arranged for allowing the wiper blade tip 41 to sweep over said wipe off surface 22, as for instance can be understood from FIG. 2D. By sweeping over said wipe off surface 22, in particular when done before the wiper blade 40 is wiped over at least a portion of the sensor window pane 91 again, liquid and/or other impediments can be wiped off the wiper blade 40 and onto the wipe off surface 22. As a result, liquid 62 and/or other impediments, which may be present at or near the wiper blade tip 41, in particular on or at a bottom plane 42 of the wiper blade 40, in case the wiper blade 40 has such bottom plane, may be swept off from the wiper blade 40 onto the wipe off surface 22. Preferably, the wipe off surface 22 can be located downstream from the first scraper. In other words, the first scraper edge 10 can be located between the sensor window pane 91 and the wipe off surface 22.

Additionally or alternatively, the wipe off surface 22 can be located substantially parallel to the sensor window pane 91, in particular substantially parallel to the outer face 92 of the sensor window pane 91. Preferably, the wipe off surface 22 may be substantially in line with the outer face 92 of the sensor window pane 91, as can be seen in FIGS. 2A-2F, and may for instance be offset therefrom over less than 5, preferably less than 3 mm, more preferably less than 1 mm.

The first scraper 1 may preferably protrude beyond the virtual plane P22 in which the wipe off surface 22 extends, in particular in the outward direction D3, which may be considered as a direction D3 transverse to the wipe off surface 22 and/or the virtual plane P22 in which said wipe off surface 22 extends.

Advantageously, the wipe off surface 22 can be spaced apart from the first scraper edge 10, and preferably is spaced apart from the first scraper 1, for instance spaced apart in the downward direction and/or the direction D2 in which the wiper blade 40 is moved, in particular such as to form an outlet channel 52, for instance a second outlet channel 52, for removing impediments removed from the wiper blade 40. For example, water droplets 63 or other impediments scraped off by the first scraper edge 10 may flow along a bottom side 11 of the first scraper 1 through said second outlet channel 52, whereas other impediments 61, such as for instance relatively large and/or solid parts 61 may be removed via the first outlet channel 51, as for instance can be seen in FIG. 2C.

In embodiments, the wipe off surface 22 can be formed by a second scraper 2. Said second scraper 2 can then comprise a second scraper edge 20, preferably located at a proximal end of the wipe off surface 22, which proximal end in the here shown embodiment is located at a top side of said wipe off surface 22. Preferably, the second scraper 2 may have a relatively sharp edge 20, preferably such that its angle is smaller than 120°, preferably about 90°, such as is the case in the here shown embodiment, or smaller than 90°. As may be understood from FIG. 2C, the second scraper edge 20 may scrape along a side face 44 of the wiper blade 40, preferably in a direction towards the tip 41 of the wiper blade 40, preferably substantially before said tip 41 is swiped over the wipe off surface 22 where it for instance may deposit a film of liquid, and/or other impediments. In order to allow the wiper blade 40 to deposit such liquid relatively well, in particular by spreading it out over said wipe out surface 22, the wipe out surface 22, and preferably also its portion over which the wiper blade 44 actually wipes, may have a length L22, which may be measured in the direction D2 in which the wiper blade 40 wipes over said wipe out surface 22, wherein said length L22, in the here shown exemplary embodiment formed as the height of said wipe out surface 22, can be at least 1 mm, preferably at least 2 mm, more preferably at least 3 mm, such as at least about 5 mm. Alternatively or additionally, said length L22 may be at least equal to and preferably larger than the thickness T41 of the tip 41 of the wiper blade 40 and/or the thickness T42 of the bottom plane 42 of the wiper blade 40, preferably being at least two times, more preferably at least three times as large.

Said impediments, in particular liquid impediments, may flow down along the wipe off surface 22, and may preferably be removed, in particular drained, by means of a respective outlet channel 53, in particular a third outlet channel 53. Advantageously, said outlet channel 53 may be located adjacent to a downstream end of the wipe off surface 22, wherein downstream is considered downstream in the direction D2 in which the wiper blade is moved, said downstream end preferably being a lower end of the wipe off surface 22. Further, said outlet channel 53 may form a drainage slit 53 which may be arranged for letting water through said slit by means of capillarity, as will be appreciated and understand by the person skilled in the art. In particular, the drainage slit may drain the liquid from an inlet opening 531 of the drainage slit 53 located near the downstream end of the wipe off surface 22 and towards an outlet opening 532 of the drainage slit located opposite to the inlet opening 531. Preferably, wall surfaces defining the capillary drainage slit 53, which may be relatively smooth, may extend substantially parallel to each other. Additionally or alternatively, said wall surfaces may be offset with respect to each other over a distance of preferably less than 2 mm, for example a distance between 0.1 mm and 1 mm, such as between 0.25 mm and 0.5 mm. Although the liquid may preferably be drained by means of a capillarity effect provided by said drainage slit 53, in embodiments, alternatively or additionally, active suction means may be provided. Such suction means may be provided for the third outlet channel 53, but may additionally or alternatively be provided for one or more other ones of the outlet channels 51, 52.

Although the wipe off surface 22 can be formed by an element formed as a second scraper 2 defining the second scraper edge 20 at a proximal end of the wipe off surface 22, that is not necessary. For example, at the proximal end, in particular an upper end, of the wipe off surface 22, it may curve away, for instance by blending into another surface, in particular a top surface, of the element 2 defining said wipe off surface 22. Actually, although a gap and/or an outlet channel 51 can be present between the first scraper 1 and the element defining the second scraper edge 20, this is not necessary either. For example, the wipe off surface 22 may be formed by the first scraper 1, and the wipe off surface 22 shown in the embodiment of FIG. 2A may in such alternative embodiment for instance extend all the way up to the bottom side 11 of the first scraper 1.

Advantageously, the cleaning unit 8 can comprise a further scraper 3, in particular a third scraper 3. Preferably said further scraper 3 can protrude beyond the virtual plane P22 in which the wipe off surface 22 extends and/or beyond the virtual P92 in which the outer face 92 of the sensor window pane 91 extends. Said further scraper 3, in particular a scraping edge 30 thereof, may facilitate that any contamination still remaining on the wiper blade 40, after said wiper blade 40 has been swept over the wipe off surface 22, may be removed from said wiper blade 40 at least partly.

Preferably, said scraping edge 30 may define an acute angle α30, preferably of less than 75°, more preferably less than 60°, such as about 50°, about 45°, or less. In particular, in an embodiment in which the sensor window pane 91, or at least its outer surface 92, extends substantially upwardly, for example substantially vertically, and the further scraper 3 is located at a height level below a lower end of the outer face 92 of the sensor window pane 91, a lower face 31 of the further scraper 3 extends from the scraping edge 30 of said scraper 3 and slopes away in a backward direction, especially backwards towards the virtual plane P92 in which the outer face 92 of the sensor window pane 91 extends. Such relatively sharp angle or so-called acute angle α30 may counteract that water droplets and/or other impediments removed from the wiper blade 40 may stay behind at said further scraping edge 30.

The drainage slit 53 can be formed between an element 2 defining the wipe off surface 22 and a further element 3, preferably a further element 3 defining the further scraper 3 and/or its scraper edge 30.

Figure 2E:
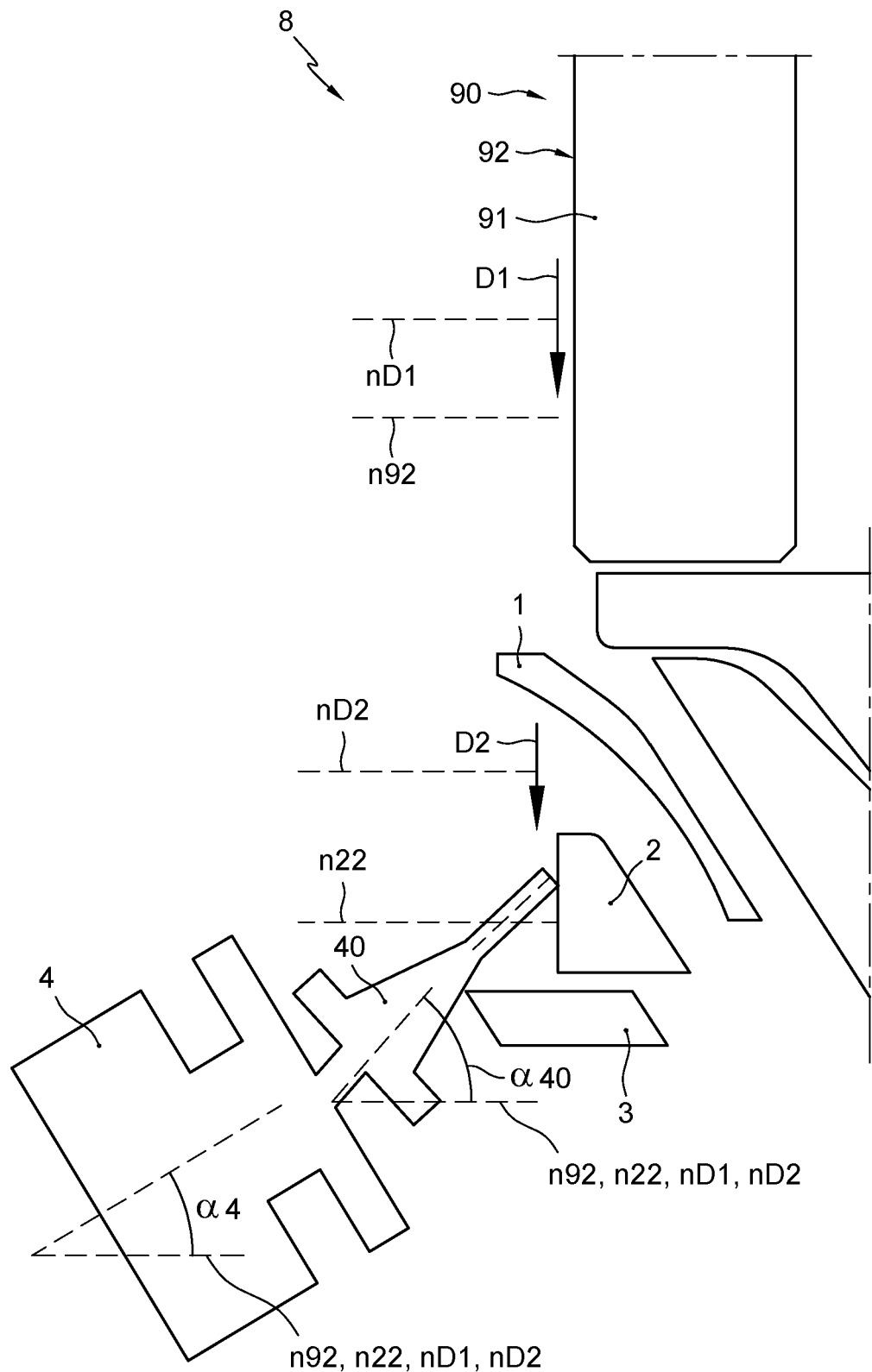
Figure 2F:
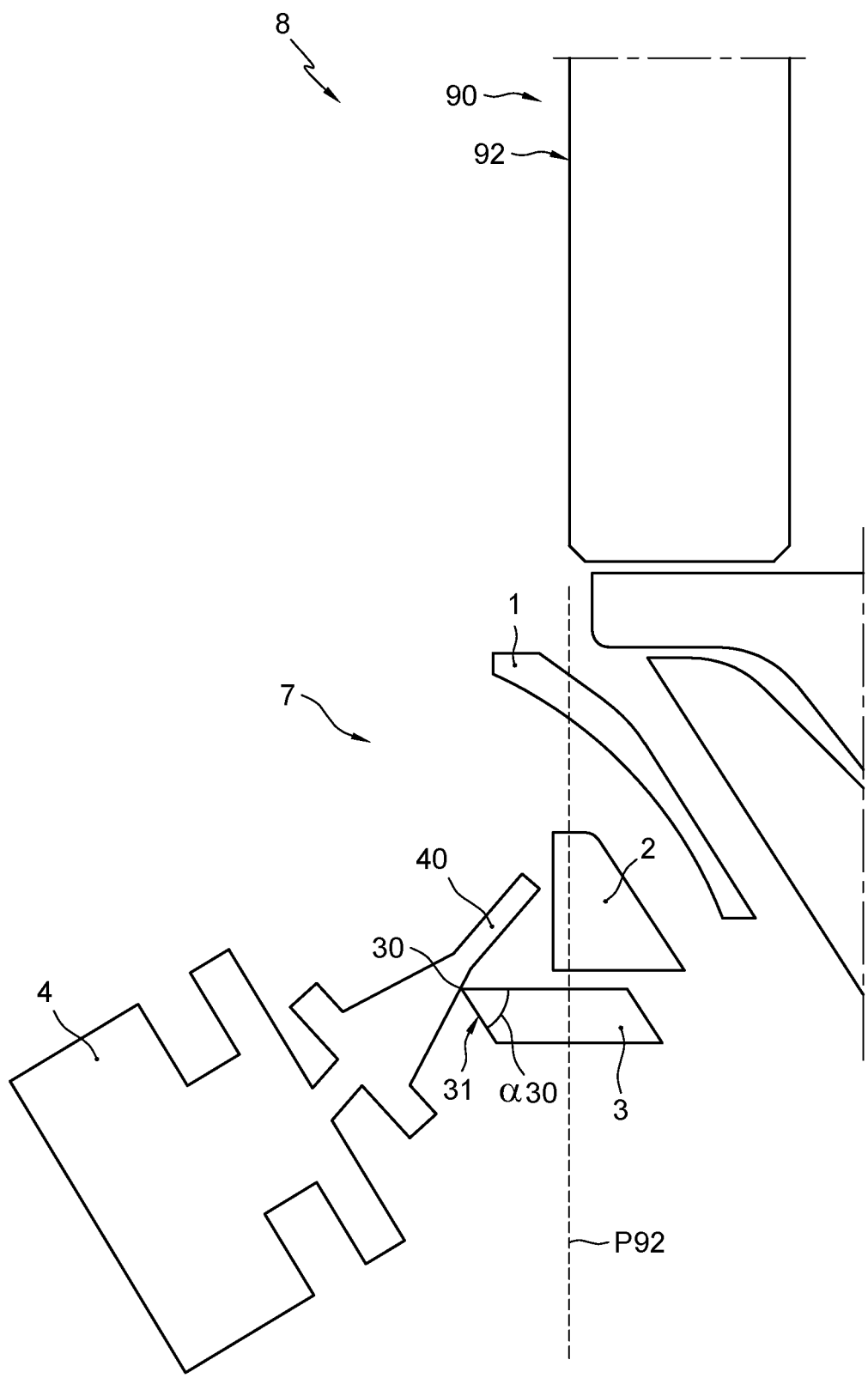

It will be appreciated that during use, the wiper blade 40, especially its tip 41, may thus first be wiped over at least a portion of the outer surface 92 of the sensor window pane 91, in particular in a substantially downward direction D1, as shown in FIG. 2A. Subsequently, the wiper blade 40, which may be moved further, in particular further downwards D2, may abut a first scraper 1, which may scrape off at least a portion of impediments 61 accumulated on the wiper blade 40, as shown in FIG. 2B. Subsequently, the wiper blade 40, which may be moved further, in particular further downwards D2, may encounter the element 2 defining the wipe off surface 22, and in an embodiment in which said element 2 is provided with an additional scraping edge 20, said edge 20 may scrape off at least a further portion of impediments accumulated on the wiper blade 40, as shown in FIG. 2C. However, in alternative embodiments, said element 2 may be formed differently, and may for example have a rounded upper edge which can serve as part of the wipe off surface 22. After encountering said element 2, the wiper blade 40, in particular its tip 41, may be swept over the wipe off surface 22, as can be seen in FIG. 2D, in particular until the wiper blade abuts the third scraper 3, as can be seen in FIG. 2E. Subsequently the third scraper edge 30 of said third scraper 3 may scrape off at least a part of any impediments still remaining on the wiper blade 40, as can be seen in FIG. 2F.

Subsequently, the wiper blade 40 may be moved back to the first position on the outer surface 92 of the sensor window pane 91, preferably without the wiper blade 40 wiping over the sensor window pane 91 when it returns to said first position. Thereto, before moving the wiper blade 40 back to the first position in order to wipe again over said outer surface 92, said the wiper blade 40 may for example be moved in an outward direction D4, and/or may be tilted R4 to a certain extent. For example upon arriving at or near the first position on the outer surface 92 of the sensor window pane 91, the wiper blade 40 may be brought back in its initial state, which may correspond substantially with the rotational state of the wiper 4 and/or of the wiper blade 40 shown in FIG. 2A.

It was found that unidirectional wiping, in particular wiping from the first position to the second position and while refraining from wiping from the second substantially towards the first position, may give relatively good cleaning results, especially compared to bidirectional wiping. Refraining from wiping on the return movement of the wiper blade 40 from the second position substantially towards the first position may counteract a fluid film from being deployed onto the sensor window pane 91 during the return movement. The wiper blade 40 may thus be in contact with the sensor window pane 91 while wiping from the first position to the second position, whereas the wiper blade 40 may be disengaged from the sensor window pane 91 during movement of the wiper blade 40 from the second position substantially towards the first position.

However, in alternative embodiments, the wiper blade 40 may nevertheless also wipe the sensor window pane 91 when moving back. This is, in such alternative embodiments, the cleaning unit 7 may be arranged for bidirectional wiping, i.e. wiping back and forth, wherein the wiper blade 40 is cleaned at least partly by scraping off impediments at least partly by means of at least a first scraper 1 before wiping backwards over the sensor window pane 91.

In embodiments, during wiping the wiper blade 40 over the sensor window pane 91 and/or during cleaning the wiper blade 40, in particular by means of the scraper unit 7 and/or the first scraper 1 and/or the wipe off surface 22 and/or the further scraper 3, the wiper 4 and/or the wiper blade 40 may be held substantially in a certain position, in particular a certain rotational position, and can be moved substantially linearly, in particular in a wiping direction D1 and/or a substantially downward direction D2, first along the sensor window pane 91, and subsequently over the first scraper 1. Preferably, the wiper 4 and/or the wiper blade 40 may subsequently be still held substantially in said certain predetermined position when it may subsequently be moved along the wipe off surface 22. In particular, the wiper 4 and/or the wiper blade 40, which may be an elongate wiper blade 40 extending in a direction transverse to the plane of the drawing, may be in substantially the same position with respect to the outer surface of the sensor window pane 91 during wiping said sensor window pane 91 as with respect to the wipe off surface 22 when wiping over said wipe off surface 22. For example, the wiper 4 and/or the wiper blade 40 may be moved under an angle α4, α40 with respect to the normal n92, n22, nD1, nD2 to the sensor window pane's outer surface 92 and/or the wipe off surface 22 and/or the direction in which the wiper 4 and/or wiper blade 40 is moved, wherein said angle α4, α40 may be an acute angle, preferably between 20° and 70°, more preferably between 30° and 60°, such as between 40° and 50°, for example about 45°.

It will be appreciated that subsequently, in particular prior to returning the wiper blade 40 to its first position, said wiper blade 40 may be tilted such that while moving it back to said first position it may be in another rotational position in which it does not touch the sensor window pane 91. Alternatively, in case of bidirectional wiping instead of unidirectional wiping, the wiper blade 40 may also be tilted or rotated prior to returning the wiper, in particular substantially to a rotational position substantially mirrored with respect to the rotational position in FIG. 2A, such as to facilitate that the wiper blade 40 may wipe impediments off from the sensor window pane 91 on the return run. Further, it will be appreciated by the person skilled in the art that, for instance in such embodiments a second scraper unit may be provided, in particular at an opposite end of the sensor window pane 91, for example above the sensor window pane 91 in case of an upwardly, preferably substantially vertically, extending sensor window pane outer surface 92.

It is noted that for the purpose of clarity and a concise description features are described herein as part of the same or separate embodiments, however, it will be appreciated that the scope of the present disclosure may include embodiments having combinations of all or some of the features described. In particular, it is noted that the skilled person will directly and unambiguously understand that features described as part of a certain aspect, for example features relating the cleaning unit 8, will be considered to be disclosed also in the context of other aspects of the present disclosure, such as for instance in the context of a scraper unit 7 and/or in the context of a method for cleaning a sensor window pane 91.

Further, it is noted that the invention is not restricted to the embodiments described herein. It will be understood that many variants are possible. Such other variants will be apparent for the person skilled in the art and are considered to lie within the scope of the invention as formulated in the following claims.

The invention claimed is:

1. A cleaning unit for cleaning a sensor window pane of an optical sensing device of a motor vehicle, said cleaning unit comprising:
a wiper blade;
at least a first scraper for scraping impediments off the wiper blade; and
a wipe off surface, wherein:
the cleaning unit is arranged for wiping the wiper blade over the sensor window pane, the cleaning unit is arranged for moving the wiper blade with respect to and along the first scraper and/or moving the first scraper with respect to and along the wiper blade for scraping impediments off the wiper blade, and the cleaning unit is arranged for allowing the wiper blade to sweep over the wipe off surface, wherein the wipe off surface is spaced apart from a first scraper edge defined by the first scraper, so as to form an outlet channel.

2. The cleaning unit according to claim 1, wherein the first scraper is fixed with respect to the position of the sensor window pane, and wherein the cleaning unit is arranged for moving the wiper blade with respect to the first scraper such as to scrape the wiper blade along the scraper.

3. The cleaning unit according to claim 1, wherein the first scraper protrudes beyond a virtual plane in which an outer face of the sensor window pane extends.

4. The cleaning unit according to claim 1, wherein the cleaning unit is arranged to allow said first scraper edge to engage a side face of the wiper blade at a location spaced apart from a tip of the wiper blade, and then scrape along the side face towards the tip.

5. The cleaning unit according to claim 1, wherein the wipe off surface is located downstream from the first scraper.

6. The cleaning unit according to claim 1, wherein the wipe off surface is located substantially parallel to the sensor window pane.

7. The cleaning unit according to claim 1, wherein the first scraper protrudes beyond a virtual plane in which the wipe off surface extends.

8. The cleaning unit according to claim 1, wherein the wipe off surface is formed by a second scraper, and wherein said second scraper comprises a second scraper edge located at a proximal end of the wipe off surface, wherein the wipe off surface is spaced apart from the first scraper edge.

9. The cleaning unit according to claim 1, wherein the cleaning unit further comprises a further scraper, wherein the further scraper protrudes beyond a virtual plane in which the wipe off surface extends.

10. The cleaning unit according to claim 9, wherein the further scraper comprises a scraping edge defining an acute angle.

11. The cleaning unit according to claim 9, wherein the sensor window pane extends substantially upwardly, wherein the further scraper is located at a height level below a lower end of the sensor window pane, wherein the further scraper includes a further scraping edge, and a lower face, said lower face extends from said further scraping edge and slopes away in a backward direction towards a virtual plane in which an outer face of the sensor window pane extends.

12. The cleaning unit according to claim 1, wherein adjacent to a downstream end of the wipe off surface a drainage slit is provided for draining liquid which has been wiped off from the wiper blade onto the wipe off surface.

13. The cleaning unit according to claim 12, wherein the drainage slit is arranged for letting water through said slit by means of capillarity.

14. The cleaning unit according to claim 12, wherein the drainage slit is formed between an element defining the wipe off surface and a further element.

15. The cleaning unit according to claim 1, wherein the cleaning unit is arranged for wiping the wiper blade over the sensor window pane from a first position towards a second position such as to wipe at least a first portion of the sensor window pane located between said first position and said second position, and wherein the cleaning unit is arranged for moving the wiper blade back from said second position substantially towards said first position without wiping over said first portion of the sensor window pane.

16. A scraper unit for the cleaning unit according to claim 1, comprising at least the first scraper, wherein the first scraper includes a first scraper edge for scraping impediments off the wiper blade of the cleaning unit, wherein the scraper unit further comprises a wipe off surface, wherein the wipe off surface is spaced apart from the first scraper edge so as to form an outlet channel spaced apart from the first scraper.

17. The scraper unit according to claim 16, wherein the wipe off surface is formed by a second scraper, and wherein the second scraper comprises a second scraper edge located at a proximal end of the wipe off surface which proximal end is located at the side facing the first scraper.

18. The scraper unit according to claim 16, comprising a further scraper.

19. An optical sensing device being provided with at least the scraper unit according to claim 16.

20. A method for cleaning a sensor window pane of an optical sensing device of a motor vehicle using the cleaning unit according to claim 1, comprising the steps of:
wiping at least a portion of the sensor window pane by means of the wiper blade; and
scraping along a side face of the wiper blade by means of at least the first scraper.

21. The method according to claim 20, further comprising sweeping a tip of the wiper blade over a wipe off surface in order to wipe liquid and/or other impediments off the wiper blade and onto the wipe off surface, before again wiping the wiper blade over at least a portion of the sensor window pane.

22. The method according to claim 20, further comprising scraping for a second time along the side face of the wiper.

23. An optical sensing device being provided with at least the cleaning device according to claim 1.

* * * * *